Jan. 26, 1926. 1,570,609
A. M. BRENNE
HAND BRAKE
Filed Oct. 8, 1923

Witnesses
Wm. Geiger

Inventor
Arild M. Brenne
By George J. Haight
His Atty.

Patented Jan. 26, 1926.

1,570,609

UNITED STATES PATENT OFFICE.

ARILD M. BRENNE, OF CHICAGO, ILLINOIS, ASSIGNOR, BY MESNE ASSIGNMENTS, TO W. H. MINER, INC., A CORPORATION OF DELAWARE.

HAND BRAKE.

Application filed October 8, 1923. Serial No. 667,120.

*To all whom it may concern:*

Be it known that I, ARILD M. BRENNE, a citizen of the United States, residing at Chicago, in the county of Cook and State of Illinois, have invented a certain new and useful Improvement in Hand Brakes, of which the following is a full, clear, concise, and exact description, reference being had to the accompanying drawings, forming a part of this specification.

This invention relates to improvements in hand brakes.

One object of the invention is to provide a hand brake wherein a simple, efficient and readily releasable locking means is provided.

A more specific object of the invention is to provide in a device of the character described, a lever operated dog coacting with the ratchet wheel on the brake staff or other chain tightening member, wherein the dog is movably mounted on the release lever and has a toggle action while being withdrawn from the ratchet wheel, whereby, the effective leverage is increased, facilitating the disengagement of the dog.

Other objects and advantages of the invention will more clearly appear from the description and claims hereinafter following.

Figure 1:
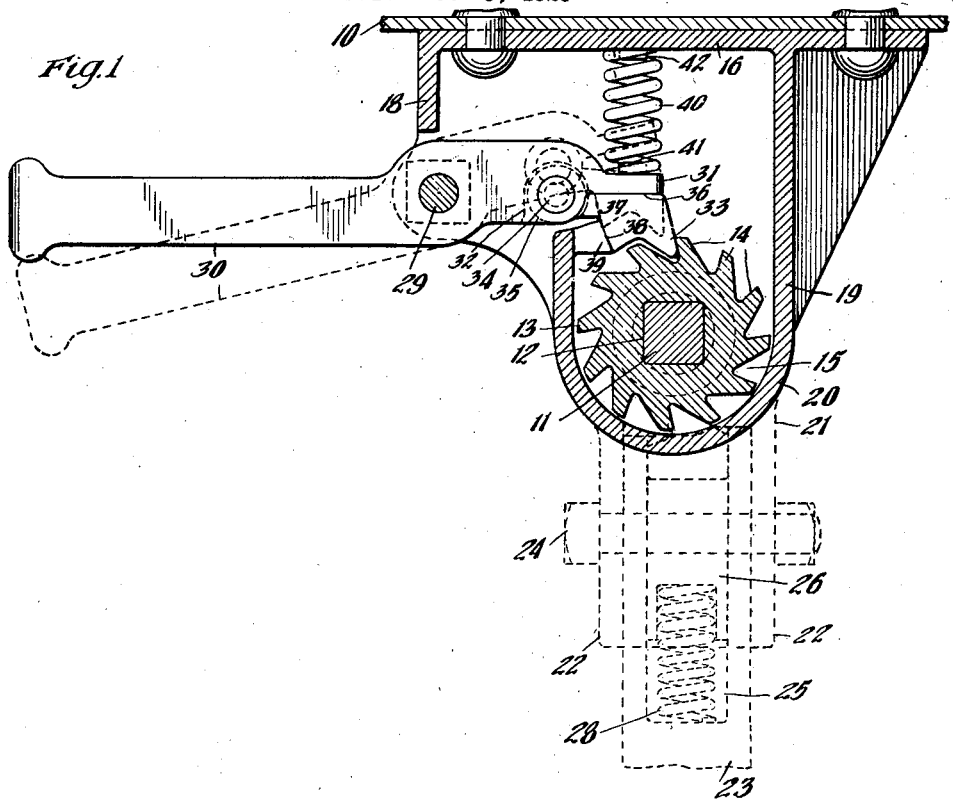
Figure 2:
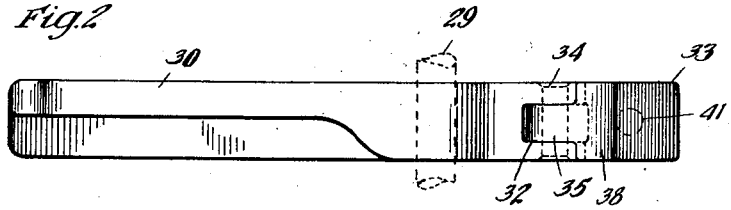

In the drawing forming a part of this specification, Figure 1 is a horizontal, sectional view of a portion of a hand brake shown as applied to the end wall of the car and embodying my improvements. Figure 2 is an edge elevational view of the locking lever and dog carried thereby.

In said drawing, 10 indicates a portion of the end wall of a freight car to which my improved brake is adapted to be secured. In carrying out the invention, as shown in the drawing, a vertical brake staff 11 is employed, the upper end thereof being squared as indicated at 12 and upon which is adapted to be applied a ratchet wheel 13 having undercut ratchet teeth 14. The staff extends through a suitable opening in the bottom wall 15 of a bracket 16 which is secured to the car wall 10. Said bracket 16 is provided with vertically arranged flanges 18 and 19 forming part of a housing, the flange 19 having a curved portion indicated at 20. A carrier 21 is oscillatably mounted on the ratchet wheel 13 and the housing, said carrier being provided with a pair of laterally extended, spaced arms 22 between which is pivotally mounted the operating, gravity drop handle 23 on the bolt 24. The handle 23 is provided with a socket indicated at 25 and in which is slidably mounted a pawl 26. The pawl has the usual elongated slot through which the bolt 24 passes so as to adapt the pawl for back and forth sliding movement. It is normally held in its outermost position by a spring 28. The housing is completed by the usual cap plate, the parts being held in assembled relation by the bolt 29. As will be understood by those skilled in the art, when the handle 23 is elevated to horizontal position about its pivotal mounting, the pawl is brought into alinement with the ratchet wheel and the latter with the staff may be advanced step by step in a winding direction. When the handle is released, it falls by gravity thereby disengaging the pawl from the ratchet wheel.

To lock the ratchet wheel and staff in position, I provide the following construction. Pivotally mounted on the bolt 29 is a release lever 30, the same being reduced at the end adjacent the ratchet wheel, thereby providing an offset extension 31. Inwardly of the extension 31, the side of the lever adjacent the ratchet wheel 13 is horizontally slotted as indicated at 32, forming a fork. A toothed locking dog 33 is pivotally mounted in the forked end of lever 30 by means of a pivot pin 34 extending through the reduced lateral extension 35 thereon. The tooth 33 has a flat rear face 36 adapted to abut the flat front face of the extension 31, and a heel 37 having a beveled face 38 adapted to engage with a correspondingly beveled face on an upstanding stop 39 formed integral with the flange 20 and the bottom wall 15 of the bracket 16. A coiled spring 40 is interposed between the extension 31 of the lever and the back wall of the bracket 16, the same being held in proper position by studs 41 and 42 on the extension and wall respectively. The spring 40 is adapted to force the dog toward the ratchet wheel and hold the dog 33 in yielding engagement with the ratchet wheel 13.

As clearly shown in Figure 1, the dog 33 is pivotally mounted on the lever 30 at a point between the ratchet wheel and the pivot point of the lever, and the arrangement is such that the heel of the dog 33 will engage the beveled face of the stop 39 when the tooth of the dog is in locking position, the beveled face of the stop being so positioned with reference to the tooth engaged by the dog, that the force acting through the dog will tend to hold the dog engaged with the stop, and yet sufficiently inclined to permit the dog to be readily withdrawn when swung away from the ratchet wheel by the lever 30.

When the brake staff is rotated in a direction to tighten the brakes, the dog in ratcheting over the teeth 14 will move bodily with the lever 30 about the pivot 29 due to the same being pivoted to the lever and abutting the extension 31 thereof, and the spring 40 constantly forcing the lever toward the ratchet wheel.

To disengage the tooth from the ratchet wheel, the outer end of the handle 30 is pulled away from the car wall, thereby swinging the inner end of the lever away from the ratchet wheel. The dog 33 being pivotally connected to the lever, is permitted to swing slightly in the direction of unwinding movement of the ratchet wheel while being pulled away from the same by the lever, thus easing off the load, which is quite appreciable in the last portion of the winding up of the brakes, and effecting an easy release of the dog. It will be evident that during the releasing movement of the lever 30, due to the dog being pivoted on the lever at a point inwardly from the end thereof, the effective leverage will be increased over that had if the dog were a fixed part of the lever. The increased leverage is in direct proportion to the distance of the point of the tooth of the dog from the pivot point of the same and the distance from the pivot point of the lever to the pivot 34. The backward movement of the dog in easing off the load during release, as hereinbefore described, will, before the load is entirely released, permit the tooth of the ratchet wheel engaged thereby to move a distance proportionate to the relative inclination, as shown in Figure 1, of the engaged face of the tooth and the abutment face of the stop 39.

It will be evident that by the arrangement herein shown and described, involving the dog pivoted to the handle, all the usual advantages of the positive locking and holding of the ratchet wheel due to the undercutting of the teeth of the same are had without the attendant disadvantages common in the usual construction of locking means, where the dog is a fixed part of the lever, and in being swung away from the ratchet wheel must necessarily advance the latter to a certain extent in a chain winding direction before the tooth can be entirely disengaged from the ratchet wheel. It will also be evident, therefore, that a locking means is thus provided which may be released with a minimum amount of effort on the part of the operator.

I have herein shown and described what I now consider to be the preferred manner of carrying out my invention, but the same is merely illustrative, and I contemplate all changes and modifications that come within the scope of the claims appended hereto.

I claim:

1. In a hand brake, including a brake winding shaft having a ratchet wheel thereon and means for rotating the shaft, the combination with a locking dog; of an operating lever therefor; and a fixed stop opposing movement of said dog by the ratchet wheel when the dog is in locking position, said stop being arranged to permit releasing movement of said dog in the direction of releasing movement of said ratchet wheel.

2. In a hand brake, including a rotary brake staff having a ratchet wheel thereon, the combination with a pivoted locking lever; of a locking dog adapted to engage with the teeth of the ratchet wheel, said dog being pivoted to said lever at a point between the ratchet wheel and the pivot of said lever; and a stop between the pivot of said lever and the ratchet wheel adapted to coact with said dog to hold it in locking position.

3. In a hand brake, the combination with a rotatable brake staff; of a ratchet wheel fixed to said staff; a housing in which said staff is journaled; a locking lever pivotally mounted on the housing; yielding means for forcing one end of said lever toward said ratchet wheel; a locking dog coacting with said ratchet wheel, said dog being pivotally mounted on said lever; means on said lever for limiting the pivotal movement of said dog in one direction relatively thereto; and an abutment on the housing for limiting the movement of said dog while in engagement with the teeth of the ratchet wheel.

4. In a brake including tightening means comprising a rotary element having a ratchet wheel thereon provided with undercut teeth, the combination with a pivoted lever; of a dog operatively connected to said lever and movable relatively thereto, said dog having a tooth thereon adapted to coact with said undercut teeth; and means engaging and guiding said dog, during withdrawal from said ratchet wheel, in a path away from the undercut face of the tooth engaged by said dog.

In witness that I claim the foregoing I have hereunto subscribed my name this 4th day of October 1923.

ARILD M. BRENNE.